(12) United States Patent
Jang et al.

(10) Patent No.: US 8,736,203 B2
(45) Date of Patent: May 27, 2014

(54) INVERTER/CHARGER INTEGRATED DEVICE AND METHOD FOR CONTROLLING THE SAME

(75) Inventors: Jae Hoon Jang, Seoul (KR); Byung Woon Jang, Anyang-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 30 days.

(21) Appl. No.: 13/423,111

(22) Filed: Mar. 16, 2012

(65) Prior Publication Data
US 2012/0235605 A1 Sep. 20, 2012

(30) Foreign Application Priority Data
Mar. 18, 2011 (KR) .................... 10-2011-0024573

(51) Int. Cl.
H02P 1/00 (2006.01)
H02P 7/00 (2006.01)
H02P 27/04 (2006.01)

(52) U.S. Cl.
USPC ..................... 318/139; 318/440; 318/801

(58) Field of Classification Search
USPC ........................ 318/139, 440, 801
See application file for complete search history.

(56) References Cited

U.S. PATENT DOCUMENTS 7,402,919 B2 * 7/2008 Ishikawa et al. ............. 307/10.1
7,595,606 B2 * 9/2009 Loubeyre ..................... 320/104
2005/0116680 A1 * 6/2005 Ishikawa et al. ............. 318/801

FOREIGN PATENT DOCUMENTS

| CN | 1640713 | 7/2005 |
| JP | 05207664 | 8/1993 |
| JP | 08126122 | 5/1996 |
| WO | 2010103063 | 9/2010 |

OTHER PUBLICATIONS

The State Intellectual Property Office of the People's Republic of China Application 201210072025.3, Office Action dated Dec. 4, 2013, 6 pages.
Japan Patent Office Application Serial No. 2012-060940, Office Action dated Aug. 6, 2013, 4 pages.

* cited by examiner

Primary Examiner — Eduardo Colon Santana
Assistant Examiner — Gabriel Agared
(74) Attorney, Agent, or Firm — Lee, Hong, Degerman, Kang & Waimey

(57) ABSTRACT

An inverter/charger integrated device is provided. The inverter/charger integrated device includes: a three-phase motor; a rectifying unit configured to rectify AC power for charging a battery and output the rectified AC power to a neutral point of the three-phase motor; a rectifier/inverter integrated unit configured to be connected to the rectifying unit and charge the battery; and a control unit configured to control the charging of the battery and an operation of the three-phase motor.

4 Claims, 4 Drawing Sheets

INVERTER/CHARGER INTEGRATED DEVICE AND METHOD FOR CONTROLLING THE SAME

CROSS-REFERENCE TO RELATED APPLICATIONS

Pursuant to 35 U.S.C. 119, this application claims the benefit of earlier filing date and right of priority to Korean Patent Application No. 10-2011-0024573, filed on Mar. 18, 2011, the contents of which is hereby incorporated by reference herein in its entirety.

BACKGROUND

The present disclosure relates to an inverter/charger integrated device which charges a battery for supplying driving power to a motor provided to a vehicle and includes an inverter for driving a three-phase motor, and a method for controlling the same.

An electric vehicle typically includes a high-voltage battery, a three-phase motor, and an inverter.

The high-voltage battery may be charged with a high voltage of about 720V.

The three-phase motor may drive the electric vehicle by using the power charged in the high-voltage battery.

The inverter may drive the three-phase motor.

That is, it may be limited according to a capacity of the high-voltage battery to drive the three-phase motor by using the power charged in the high-voltage battery.

When the power remaining in the high-voltage battery of the electric vehicle is lower than a predetermined level, the three-phase motor may not be driven any more. Therefore, the electric vehicle may be provided with a high-voltage charger to charge the high-voltage battery. This high-voltage charger may be classified into a slow charger using household single-phase AC power and a high-speed charger using three-phase power for power transmission and distribution.

Further, the electric vehicle includes, besides the three-phase motor, various loads such as electronic devices and lighting devices consuming low power of about 12V. A low-voltage battery may be installed to operate the loads consuming low power, and a low-voltage charger for charging the low-voltage battery may be provided.

The inverter, the high-voltage charger, and the low-voltage charger are separated from each other. Therefore, it takes a lot of time and effort to design the inverter, the high-voltage charger, and the low-voltage charger so as to be suitably installed in the electric vehicle.

SUMMARY

Embodiments provide an inverter/charger integrated device for controlling three-phase AC power inputted according to a buck-boost operation by using a buck-type three-phase rectifier, a three-phase motor, and an inverter so that a power factor of the three-phase AC power nearly becomes 1, and a method for controlling the same.

Embodiments also provide an inverter/charger integrated device for charging a high-voltage battery at high speed, charging a low-voltage battery by using the power charged in the high-voltage battery, and driving a three-phase motor, and a method for controlling the same.

In one embodiment, an inverter/charger integrated device includes: a three-phase motor; a rectifying unit configured to rectify AC power for charging a battery and output the rectified AC power to a neutral point of the three-phase motor; a rectifier/inverter integrated unit configured to be connected to the rectifying unit and charge the battery; and a control unit configured to control the charging of the battery and an operation of the three-phase motor.

Also, the rectifying unit may include: a first rectifying unit configured to rectify three-phase AC power for high-speed charging of the battery; and a second rectifying unit configured to rectify single-phase AC power for slow charging of the battery.

Also, the inverter/charger integrated device may further include a switch unit configured to selectively connect the first and second rectifying units to the three-phase motor according to a charging mode.

Also, the switch unit may cut off the rectifying unit from the three-phase motor when the three-phase motor is in a driving mode.

Also, the inverter/charger integrated device may further include a low-voltage rectifying unit configured to convert the AC power rectified by the rectifying unit into DC power, drop voltage of the DC power, and output low-voltage DC power.

Also, the rectifier/inverter integrated unit may convert the AC power rectified by the rectifying unit into DC power to charge the battery.

Also, the rectifier/inverter integrated unit may drive the three-phase motor by using charged power of the battery in a driving mode.

In another embodiment, a method for controlling an inverter/charger integrated device includes: rectifying AC power in a battery charging mode; converting the rectified AC power into DC power; charging a battery with the DC power; and driving a three-phase motor with the power charged in the battery in a driving mode.

Also, the method may further include selecting one of the battery charging mode and the driving mode.

Also, the battery may be charged according to one selected from a high-speed charging mode and a slow charging mode.

Also, three-phase AC power may be rectified to charge the battery when the high-speed charging mode is selected.

Also, single-phase AC power may be rectified to charge the battery when the slow charging mode is selected.

Also, a switch unit may be connected to one of a rectifier for the high-speed charging and a rectifier for the slow charging according to the selection between the high-speed charging mode and the slow charging mode.

Also, the connected rectifier may be disconnected in the driving mode.

Also, the connected rectifier may be disconnected when the charging mode is completed.

In further another embodiment, a method for controlling an inverter/charger integrated device includes: selecting one of a charging mode and a driving mode; connecting AC power when the charging mode is selected; rectifying the AC power; converting the rectified AC power into DC power; and charging a battery with the DC power.

Also, the method may further include: selecting one of a high-speed charging mode and a slow charging mode when the charging mode is selected; and connecting three-phase AC power when the high-speed charging mode is selected, and connecting single-phase AC power when the slow charging mode is selected.

Also, the three-phase power or single-phase power may be connected according to an operation of a switch unit when one of the high-speed charging mode and slow charging mode is selected.

Also, the details of one or more embodiments are set forth in the accompanying drawings and the description below.

Other features will be apparent from the description and drawings, and from the claims.

DETAILED DESCRIPTION OF THE EMBODIMENTS

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the invention, so it should be understood that other equivalents and modifications could be made thereto without departing from the spirit and scope of the invention.

According to the present embodiments, a three-phase rectifier and a single-phase rectifier for charging a battery are integrated with an inverter. Therefore, advantages in terms of wiring, volume, weight, and cost can be obtained.

Furthermore, since a high-speed charging function is provided, a battery can be rapidly charged when the battery is low.

Figure 1:
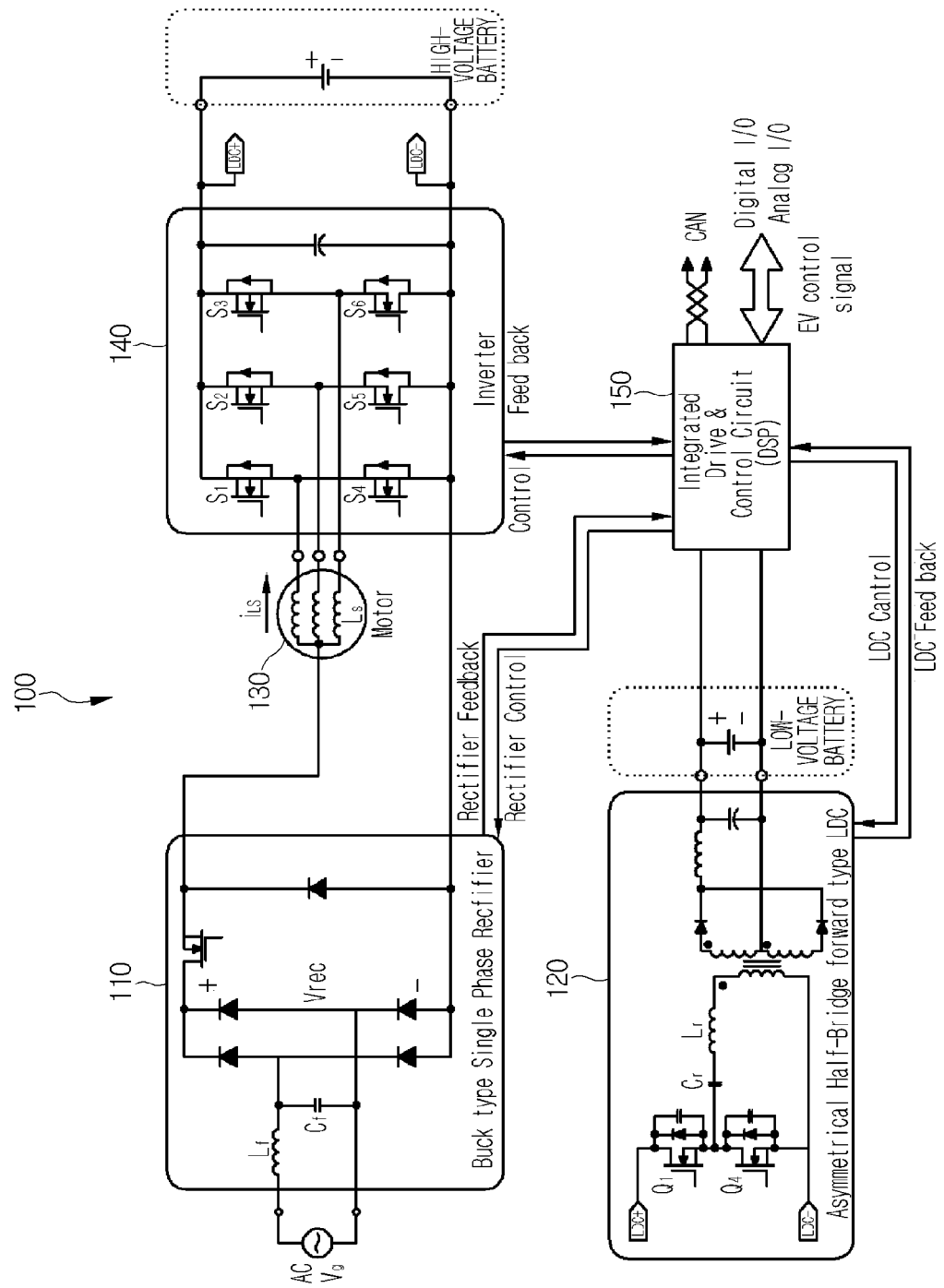
FIG. 1 is a block diagram illustrating an inverter/charger integrated device according to a first embodiment.

FIG. 1 is a block diagram illustrating an inverter/charger integrated device according to a first embodiment.

Referring to FIG. 1, an inverter/charger integrated device 100 according to the first embodiment includes a single-phase rectifying unit 110, a low-voltage rectifying unit 120, a three-phase motor 130, an inverter 140, and a control unit 150.

The single-phase rectifying unit 110 may rectify a single-phase input. The single-phase rectifying unit 110 may rectify single-phase AC power to provide power for charging a battery. The single-phase rectifying unit 110 may receive household 220V single-phase AC power.

The low-voltage rectifying unit 120 may supply low-voltage DC power to a load including the control unit 150. The low-voltage rectifying unit 120 may receive DC power rectified by the inverter 140 and drop voltage of the DC power to provide the voltage-dropped DC power to a device included in the inverter/charger integrated device 100 which needs low-voltage (for example, about 12V) DC power.

The three-phase motor 130 may drive an electric vehicle. In a charging mode, the three-phase motor 130 may output the AC power rectified by the single-phase rectifying unit 110 to the inverter 140. In a driving mode, the three-phase motor 130 may be supplied with AC power generated by the inverter 140 using the power charged in the battery.

The inverter 140 may drive the three-phase motor 140 and supply charging power to the battery. The inverter 140 may receive the AC power rectified by the single-phase rectifying unit 110 from the three-phase motor 130 in the charging mode to rectify the received AC power into DC power. The inverter 140 may convert the DC power charged in the battery into three-phase AC power in the driving mode to drive the three-phase motor 130.

The control unit 150 may control the single-phase rectifying unit 110, the low-voltage rectifying unit 120, and the inverter 130. The control unit 150 may control a switch capable of cutting off the single-phase rectifying unit 110 from the three-phase motor 130.

Figure 2:
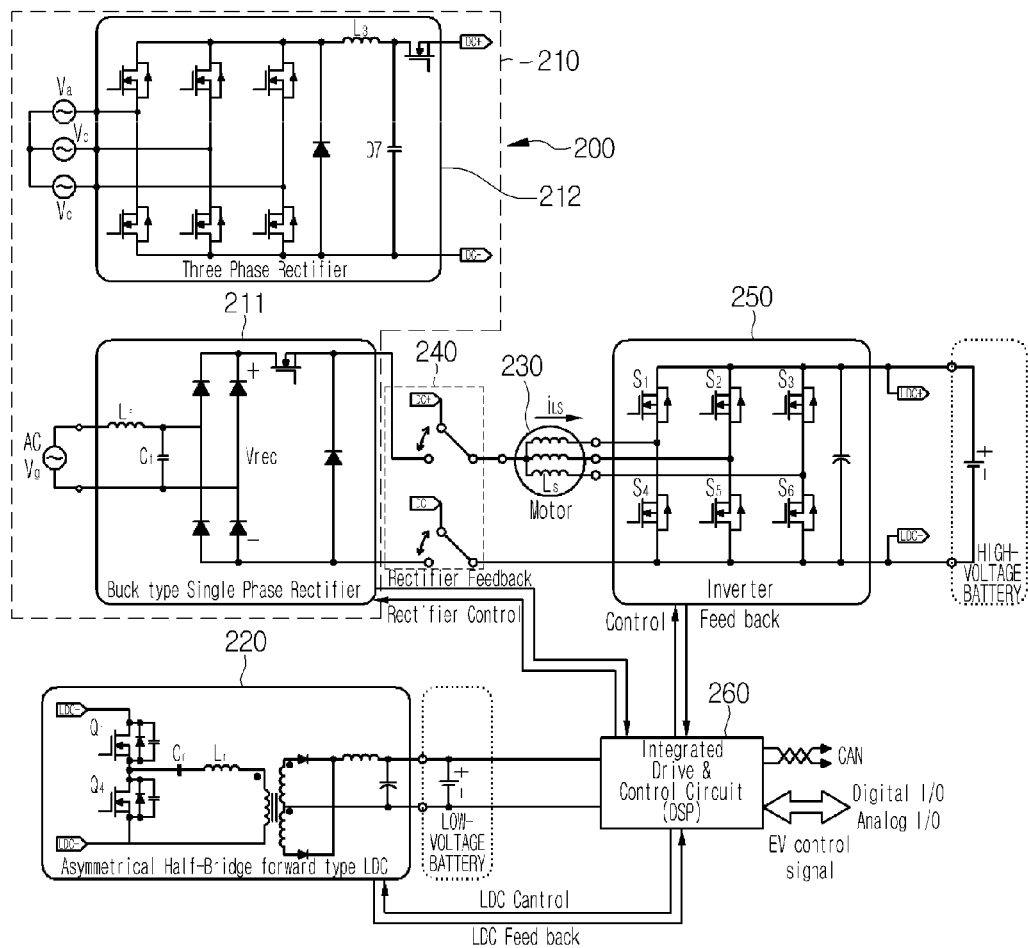
FIG. 2 is a block diagram illustrating an inverter/charger integrated device according to a second embodiment.

FIG. 2 is a block diagram illustrating an inverter/charger integrated device 200 according to a second embodiment.

Referring to FIG. 2, the inverter/charger integrated device 200 according to the second embodiment includes a rectifying unit 210, a low-voltage rectifying unit 220, a three-phase motor 230, an inverter 250, and a control unit 260.

The rectifying unit 210 includes a single-phase rectifying unit 211 and a three-phase rectifying unit 212.

The single-phase rectifying unit 211 may rectify single-phase AC power to provide power for charging a battery. The single-phase rectifying unit 211 may receive household 220V single-phase AC power. Further, the single-phase rectifying unit 211 may be a slow charger in a charging mode. Currently, it takes about six hours to charge the battery of an electric vehicle by using the typical household single-phase AC power.

The three-phase rectifying unit 212 may rectify three-phase AC power to provide power for charging the battery. The three-phase rectifying unit 212 may receive the three-phase AC power. Further, the three-phase rectifying unit 212 may be a high-speed charger in the charging mode. The three-phase rectifying unit 212 may be typically supplied with 380V three-phase AC power. A high-speed charger is required for high-speed charging of the electric vehicle. Currently, the time taken for the high-speed charging is about an hour.

The low-voltage rectifying unit 220 may output low-voltage DC power. The low-voltage rectifying unit 220 may receive DC power rectified by the inverter 240 and drop voltage of the DC power to provide the voltage-dropped DC power to a device included in the inverter/charger integrated device 200 which needs low-voltage (for example, about 12V) DC power.

The three-phase motor 230 may drive the electric vehicle. In the charging mode, the three-phase motor 230 may output the AC power rectified by the single-phase rectifying unit 211 to the inverter 250. In a driving mode, the three-phase motor 230 may be supplied with AC power generated by the inverter 250 by switching the power charged in the battery.

A switch unit 240 may be provided among the single-phase rectifying unit 211, the three-phase rectifying unit 212, and the three-phase motor 230. The switch unit 240 may switch between the single-phase rectifying unit 211 and the three-phase rectifying unit 212 according to the high-speed or slow charging. The switch unit 240 may switch between the single-phase rectifying unit 211 and the three-phase rectifying unit 212 in the charging mode. Further, in the driving mode, the switch unit 240 may cut off the three-phase motor 230 from the rectifying unit 210. The switch unit 240 may include a plurality of switches.

The inverter 250 may receive the AC power rectified by the single-phase rectifying unit 211 or three-phase rectifying unit 212 from the three-phase motor 230 and rectify the received AC power into DC power in the charging mode. The inverter 250 may convert the DC power charged in the battery into three-phase AC power in the driving mode to drive the three-phase motor 230.

The control unit 260 may control the elements included in the inverter/charger integrated device 200. The control unit 270 controls the switch unit 240 so as to cut off the three-phase motor 230 from the single-phase rectifying unit 211 or three-phase rectifying unit 212. The control unit 260 may control operations of the rectifying unit 210, the low-voltage rectifying unit 220, the three-phase motor 230, the switch unit 240, and the inverter 250.

Figure 3:
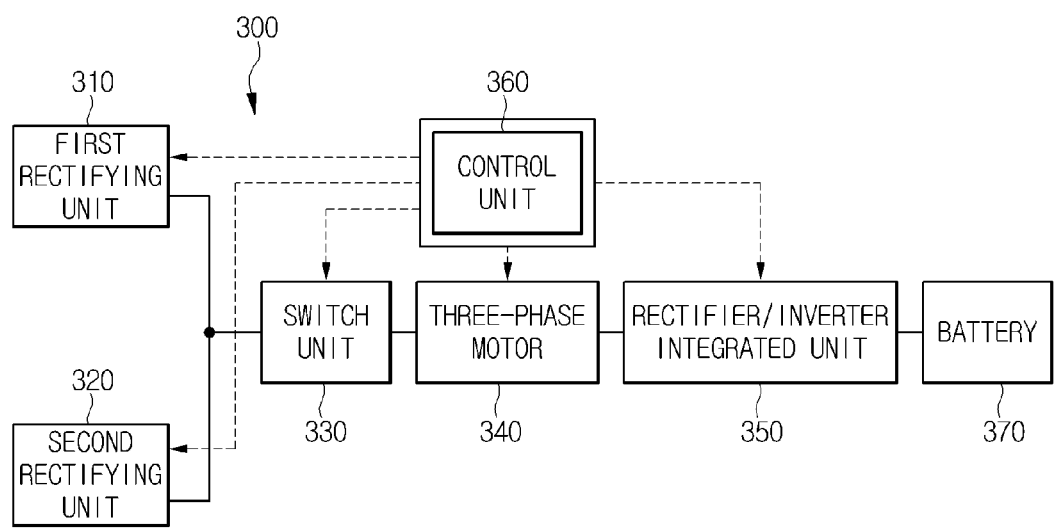
FIG. 3 is a block diagram illustrating an inverter/charger integrated device according to a third embodiment.

FIG. 3 is a block diagram illustrating an inverter/charger integrated device 300 according to a third embodiment.

Referring to FIG. 3, the inverter/charger integrated device 300 according to the third embodiment includes a first rectifying unit 310, a second rectifying unit 320, a switch unit 330, a three-phase motor 340, a rectifier/inverter integrated unit 350, and a control unit 360.

The first rectifying unit 310, for high-speed charging, may rectify three-phase AC power and output the rectified AC power to a neutral point of the three-phase motor 340.

The second rectifying unit 320, for slow charging, may rectify single-phase AC power and output the rectified AC power to the neutral point of the three-phase motor 340.

The first rectifying unit 310 may be a high-speed charger, and the second rectifying unit 320 may be a slow charger.

The switch unit 330 may switch between the first rectifying unit 310 and the second rectifying unit 320 according to the high-speed or slow charging in the charging mode. The switch unit 330 may include a plurality of switches.

The rectifier/inverter integrated unit 350 may charge the battery 370 by switching an AC power signal outputted through the three-phase motor 340 in the charging mode. Further, the rectifier/inverter integrated unit 350 may supply the DC power charged in the battery 370 to the three-phase motor 340 to drive the three-phase motor 340 in the driving mode.

The control unit 360 may control operations of the first rectifying unit 310, the second rectifying unit 320, the switch unit 330, the three-phase motor 340, and the rectifier/inverter integrated unit 350.

Figure 4:
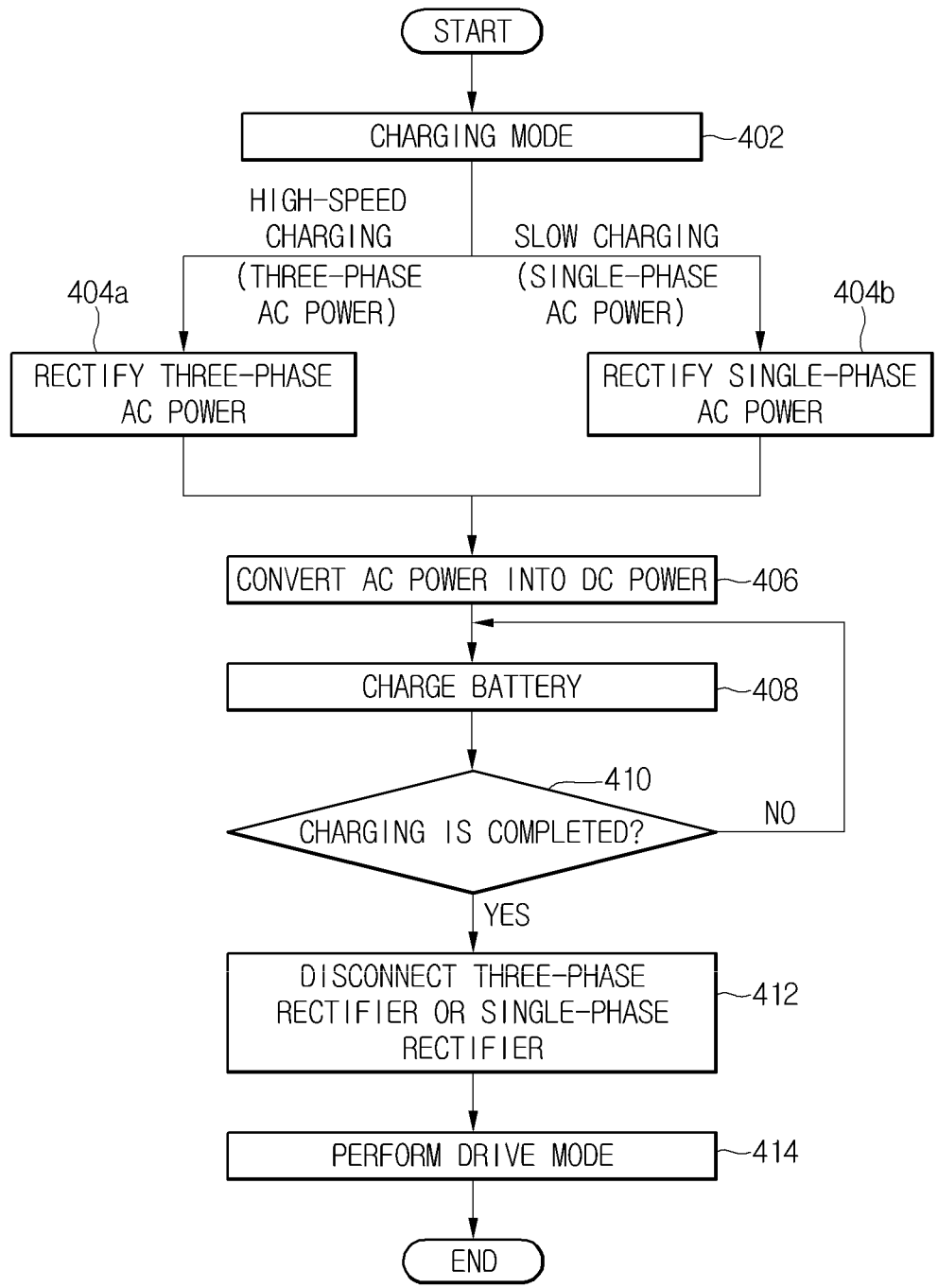
FIG. 4 is a flowchart illustrating operations for controlling an inverter/charger integrated device according to an embodiment.

FIG. 4 is a flowchart illustrating operations for controlling a rectifier/inverter integrated device according to an embodiment.

Referring to FIG. 4, one of a charging mode and a driving mode may be selected for the device. When the driving mode is selected, the device may check a state of a battery. The mode of the device may be changed from the driving mode to the charging mode according to the state of the battery.

When the charging mode is selected, one of a high-speed charging mode and a slow charging mode may be selected for the device. When the high-speed charging mode is selected to charge the battery, the device may be supplied with three-phase AC power to rectify the three-phase AC power in operation 404a.

On the contrary, when the slow charging mode is selected, the device may be supplied with single-phase AC power to rectify the single-phase AC power in operation 404b.

According to the charging mode, the device converts the three-phase AC power or single-phase AC power into DC power in operation 406.

The device may charge the battery with the DC power in operation 408.

The device determines whether the charging is completed in operation 410, and a rectifying unit is cut off from an inverter or a rectifier/inverter integrated unit when the charging is completed in operation 412. The cutting off may be performed by a switch unit, and the number of switches included in the switch unit is not limited.

According to the completion of the charging of the battery, the device may drive a three-phase motor in the driving mode in operation 414.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An inverter/charger integrated device comprising:
a three-phase motor;
a first rectifying unit configured to rectify three-phase AC power for high-speed charging of a battery;
a second rectifying unit configured to rectify single-phase AC power for low-speed charging of the battery;
a switch unit comprising at least one switch and configured to selectively connect the first or second rectifying unit to the three-phase motor according to a charging mode;
a rectifier/inverter integrated unit configured to be selectively connected to the first or second rectifying unit in order to charge the battery;
a low-voltage rectifying unit configured to decrease a DC voltage output by the rectifier/inverter unit in order to output low-voltage DC power; and
a control unit configured to control the switch unit to:
selectively disconnect the three-phase motor from the first and second rectifying units; and
selectively connect the first or second rectifying unit to the three-phase motor according to the charging mode.

2. The inverter/charger integrated device according to claim 1, wherein the control unit is further configured to control the switch unit to disconnect the first and second rectifying units from the three-phase motor when the three-phase motor is in a driving mode.

3. The inverter/charger integrated device according to claim 1, wherein the rectifier/inverter integrated is further configured to convert the AC power rectified by the first and second rectifying units into DC power in order to charge the battery.

4. The inverter/charger integrated device according to claim 1, wherein the rectifier/inverter integrated unit is further configured to drive the three-phase motor by using charged power of the battery in a driving mode.

* * * * *